United States Patent [19]

Rosenfeld

[11] Patent Number: 4,680,372

[45] Date of Patent: Jul. 14, 1987

[54] IN-SITU END-CAPPING MELT PREPARED AROMATIC POLYESTER WITH PHENYL BENZOATE

[75] Inventor: Jerold C. Rosenfeld, Tonawanda, N.Y.

[73] Assignee: Celanese Corporation, New York, N.Y.

[21] Appl. No.: 833,650

[22] Filed: Feb. 25, 1986

[51] Int. Cl.⁴ ................................................ C08G 63/12
[52] U.S. Cl. ...................................... 528/179; 528/125; 528/171; 528/173; 528/174
[58] Field of Search ................ 528/179, 125, 171, 173, 528/174

[56] References Cited

U.S. PATENT DOCUMENTS

| | | | |
|---|---|---|---|
| 3,036,990 | 6/1962 | Kantor et al. | |
| 3,395,119 | 7/1968 | Blaschke et al. | 260/47 |
| 4,075,173 | 2/1978 | Maruyama et al. | 260/47 C |
| 4,135,009 | 1/1979 | Mercurio | 427/195 |
| 4,200,731 | 4/1980 | Massey et al. | 525/437 |
| 4,255,555 | 3/1981 | Salee et al. | 528/179 |
| 4,278,785 | 7/1981 | Rosenfeld | 528/176 |
| 4,283,523 | 8/1981 | Salee et al. | 528/176 |
| 4,330,663 | 5/1982 | Rosenquist | 528/176 |
| 4,438,255 | 3/1984 | Rosenquist | 528/179 |

FOREIGN PATENT DOCUMENTS 924607  4/1963  United Kingdom .

OTHER PUBLICATIONS

Polyesters, V. V. Korshak and S. V. Vinogradova, Pergamon Press, pp. 471–472.
Partial Translation of Japanese Kokai No. 51—145,593; Dec. 14, 1976, Teijin Co., Inc.
Chemical Abstracts, vol. 84:181174n.

*Primary Examiner*—Harold D. Anderson
*Attorney, Agent, or Firm*—George A. Depaoli

[57] ABSTRACT

Linear aromatic polyesters produce by melt polymerization of a bisphenol and an aromatic dicarboxylic acid such as terephthalic acid and/or isophthalic acid are end-capped during melt polymerization by the addition of phenyl benzoate to provide benzoate terminal groups.

12 Claims, No Drawings

IN-SITU END-CAPPING MELT PREPARED AROMATIC POLYESTER WITH PHENYL BENZOATE

BACKGROUND OF THE INVENTION

This invention relates to improved linear aromatic polyesters of a bisphenol and a dicarboxylic acid. More particularly, the invention relates to such polyesters containing as terminal substituents benzoate ester groups derived from phenyl benzoate.

Linear aromatic polyesters derived from dicarboxylic acids (especially aromatic dicarboxylic acids) and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when processed into useful articles using conventional techniques, e.g. injection molding techniques provide properties superior to articles molded from other linear polyester compositions. For instance, aromatic polyesters are known to have a variety of useful properties, such as good tensile properties, impact, and bending strengths, high thermal deformation and thermal decomposition temperatures, resistance to UV irradiation, and good electrical properties.

Although the aforementioned linear aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is molded and subsequently immersed in boiling water. The tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

It has been proposed (according to T. Ueno et al, Japanese Patent No. Sho 53-8696, published Jan. 26, 1978) to enhance the hydrolytic stability of linear aromatic polyesters comprising bisphenol and dicarboxylic monomer residues by carrying out the preparation of the polyester from the bisphenol and dicarboxylic acid diacyl halide reactants in the presence of a monohydric phenolic compound such as p-tert butyl phenol. The monofunctional phenolic compound reacts with terminal carbonyl halide substituents in the polyester to form p-tert, butyl phenyl carboxylate ester end groups. However, modification of the polyester to introduce terminal carboxylate ester groups derived from monofunctional phenols (such as p-tert, butyl phenol) does not enhance the hydrolytic stability to make the products attractive commercially.

The foregoing conventional polyesters are also generally unstable on processing at elevated temperature, e.g. processing by injection molding. This processing instability is evidenced by increased coloration and a significant loss in the polyester intrinsic viscosity and molecular weight during processing.

It is the object of the invention to prepare a structurally modified linear aromatic polyester comprising bisphenol and dicarboxylic acid residues which displays hydrolytic stability.

It is another object of the invention to prepare a structurally modified linear polyester comprising bisphenol and dicarboxylic acid residues of enhanced processing stability.

SUMMARY OF THE INVENTION

According to this invention a novel thermoplastic polyester is provided by an improvement in linear aromatic polyesters which comprise residues of bisphenols and dicarboxylic acids and in which the terminal residues of the polyester chain comprise a dicarboxylate acid residue. According to this improvement the end carboxylate group of said terminal dicarboxylic acid residue comprises a carboxylate ester of phenyl benzoate.

The polyesters of bisphenol and dicarboxylic acid residues which in accordance with invention contain phenyl carboxylate ester terminal substituents are formed by melt polymerization. Typically, corresponding polyesters of bisphenol and dicarboxylic acid residues containing conventional terminal carboxylate ester groups, for example free phenol, ortho or para-substituted phenols and long chain aliphatic monofunctional alcohols of U.S. Pat. No. 4,278,785 and of the aforementioned, Japanese No. Sho 53,8696, of T. Ucno et al, have been formed by solution polymerization techniques using the diacyl halide of the dicarboxylic acid and bisphenol.

The present aromatic polyesters are substantially stable on processing, i.e. reduced coloration, and remain substantially unchanged in molecular weight, on processing.

The present invention also includes processes for preparing the present polyester by transesterification reaction of a diaryl ester of the dicarboxylic acid, the bisphenol and the phenyl benzoate so that the phenyl benzoate is reacted into the polyester when the latter is prepared by a melt polymerization technique.

DETAILED DESCRIPTION OF THE INVENTION

The bisphenol which can be employed to prepare the present polyesters are known compounds and include bisphenols and bisphenols corresponding to the general formula (I):

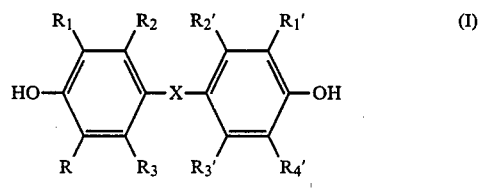

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and R$_1$, R$_2$, R$_3$, R4, R1', R2', R3', and R', which may be the same or different, each is selected from the group consisting of a hydrogen atom, a chlorine atom, a bromine atom and an alkyl group containing 1 to 4 carbon atoms, or functional derivatives thereof.

Examples of suitable bisphenols of the general formula (I) above are 4,4'-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) sulfone, bis(4-hydroxyphenyl) ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4'-hydroxyphenyl)ethane, 2,2-bis(4'-hydroxy-3'-methylphenyl)propane, 2,2-bis(4'-hydroxy-3'-chlorophenyl (propane, 2,2-bis(4'-hydroxy-3', 5'-dichlorophenyl)propane, 2,2-bis(4'-hydroxy-3,5'-dibromophenyl)propane, and 1,1-bis(4'-hydroxyphenyl)-n-butane. 2,2-bis(4'-hydroxyphenyl)propane, bisphenol A, is most typical and is readily available, and, accordingly, is most often used.

Typical examples of functional derivatives of bisphenols which can be used are the metal salts thereof and the diesters thereof with aliphatic monocarboxylic acids containing 1 to 3 carbon atoms. Preferred functional derivatives of the bisphenols are the sodium salts, the potassium salts, and the diacetate esters thereof. The bisphenols may be used either alone or as a mixture of two or more thereof.

Suitable dicarboxylic acids include aromatic dicarboxylic acids such as isophthalic acid and terephthalic acid.

When the dicarboxylic acids used in preparing a polyester of the invention comprises a mixture of both isophthalic and terephthalic acids in accordance with an especially preferred embodiment of the invention, a weight proportion of isophthalic to terephthalic acid residues in the polyester ranging from about 90:10 to 10:90, and preferably about 75:25 to about 90:10 provides an especially satisfactory result.

When the aforementioned improved melt transesterification polymerization process of the invention is employed to prepare the present polyester, the dicarboxylic acid reactant is generally a diaryl ester of the dicarboxylic acid.

The diaryl esters of the dicarboxylic acid employed as reactants in the present improved melt transesterification polymerization process are di-esters of the dicarboxylic acid with a monohydroxy aromatic compound of the benzene or napththalene series containing 6 to 20 carbon atoms, such as phenol, o, m or p-cresol, xylenol, a halophenol such as p-chlorophenol, 3,5-dibromophenol, a nitro phenol such as o-, m- or p-nitrophenol, 1-napthol, 2-naphthol, 1-hydroxy-4-methyl naphthalene, thiophenols and the like. Preferably the ester reactant is a derivative of a monohydroxy aromatic hydrocarbon, more preferably a monohydroxy aromatic hydrocarbon of the benzene series, and especially is phenol itself. While the ester groups of the dicarboxylic acid ester reactant may be derived from different monohydroxy aromatic compounds, preferably both ester groups dicarboxylic acid ester reactant are derived from the same monohydroxy aromatic compound.

In the conventional preparation of linear aromatic polyesters comprising bisphenol and dicarboxylic acid residues by transesterification polymerization, a mixture of the bisphenol and a dicarboxylic acid diaryl ester is heated, desirably under a substantially anhydrous inert atmosphere, e.g. of dry nitrogen, to a sufficiently elevated temperature, generally above about 100°, to liquefy the reactants, i.e. provide a molten reaction mass. If desired, moreover the transesterification polymerization may be conducted at temperatures below the melting point of the reactants and product i.e. as a solid state polymerization reaction.

Generally the reaction mass contains an ester-interchange or transesterification catalyst of the type described herein below. In the ensuing transesterification polymerization reaction which may be accelerated by raising the reaction mass temperature to about 350° C. the aryl group of the diaryl ester is displaced by the bisphenol to form a monohydroxy aromatic compound, e.g. a phenol. The reaction pressure is normally diminished during the reaction, e.g. from atmospheric pressure to a subatmospheric pressure of about 0.1 mm or mercury or lower. In carrying out the reaction, provision is generally made for distillative removal of the monohydroxy aromatic compound to drive the reversible transesterification process to completion.

It is often desirable to carry out the transesterification preparation of the polyester in two stages, for example a low temperature or prepolymerization stage wherein the bisphenol and diaryl ester are transesterified at a temperature of from above about 100° to about 300° C., preferably at about 175° C. to about 300° C. and especially at about 175° to about 250° C. under the aforementioned conditions of reaction pressure to prepare a low molecular weight bisphenol-dicarboxylic acid polyester (which may conveniently be termed a polyester prepolymer) having a relative intrinsic viscosity, e.g. of the order of about 0.1 to about 0.2 dl/g. The prepolymer is then conveniently heated at a somewhat higher reaction temperature preferably at about 225° to about 350° C. and especially at about 250° to about 300° C. under the aforementioned condition of reaction pressure to complete the polymerization reaction. The latter reaction stage is conveniently designated the polymerization stage and, if desired, the latter stage can be carried out in a different reaction vessel from that employed to prepare the polyester prepolymer.

The present polymerization process is carried out in the presence of an acidic, neutral or basic catalyst, such classifications being based on the reaction of a conventional acid-base indicator and the catalyst when the latter is dissolved in a polar ionizing solvent such as water.

More preferably, a basic catalyst is employed. Prior to its introduction into the reaction mass, the preferred basic catalyst is preferably converted to liquid form, e.g. by melting or by dissolution in a liquid or normally solid, low melting solvent.

Suitable basic catalysts include the alkali metals, such as lithium, sodium, potassium, rubidium, cesium and francium and the carbonates, hydroxides, hydrides, borohydrides, phenates, bisphenates, (i.e. salt of a bisphenol or bisphenol), carboxylates such as acetate or benzoate, oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum triisopropoxide and triphenyl tin hydroxide.

Phenol is the preferred solvent for the normally solid catalysts. Substituted phenols which can be used include those having the formula

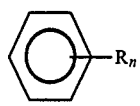

wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2.

Typical solvents include o-benzyl phenol, o-bromo phenol, m-bromo phenol, m-chloro phenol, p-chloro phenol, 2,4 dibromo phenol, 2,6 dichloro phenol, 3,5 dimethoxy phenol, o-ethoxy phenol, m-ethyl phenol, p-ethyl-phenol, o-isopropyl phenol, m-methyoxy phenol, m-propyl phenol, p-propyl phenol, and the like. Additionally, some cresols, such as metacresol, which are liquid at room temperature and do not require heating to maintain a liquid state are useful solvents.

Other solvents which are particularly useful are of the ether type, for example, tetrahydrofuran and the various glymes, for examples, ethylene glycol dimethylether and the like.

Combinations of catalyst and combinations of phenols or phenols and solvents may also be used.

Especially preferred liquid basic catalysts are charged dissolved in molten normal solid-low melting organic solvent such as phenol. Especially preferred catalysts providing excellent results are the basic catalysts, rubidium phenoxide, potassium phenoxide, and potassium borophenoxide, each dissolved in molten phenol.

Preferably, also when a basic catalyst is employed, the catalyst is introduced concurrently with the aforementioned molten reactants to the polymerization reactor to avoid heating the reactants in the presence of the catalyst prior to onset of the polymerization.

Less preferred catalysts include the metal oxides, metal acetates, titanium and tin compounds. Suitable metal oxides include antimony trioxide, germanium oxide, arsenic trioxide, lead oxide, magnesium oxide, and zinc oxide. Suitable metal acetates include cobalt acetate, zinc acetate, cadmium acetate and manganese acetate. Suitable titanium compounds include the organic titanates such as tetrabutyl titanate and tetraisopropyl titanate. Suitable tin compounds include dibutyloxide, dibutyl tin methoxide and dibutyl tin dilaurate.

The proportion of the aforementioned transesterification catalysts conventionally employed in preparing linear aromatic polyesters of bisphenols and dicarboxylic acids via transesterification is generally a catalytically effective amount, for example about 0.005 to about 2%, preferably about 0.01 to 1% by weight based on the combined weight of the weight of the bisphenol reactant and the dicarboxylic acid diaryl ester reactant and the dicarboxylic acid diaryl ester reactant. Further illustrations of suitable transesterification catalysts and suitable proportions thereof are given in British Pat. No. 924,697. The latter patent and U.S. Pat. Nos. 3,399,170 and 4,137,278 illustrate the conventional preparation by transesterification polymerization of polyesters comprising bisphenol and dicarboxylic acid residues. The aforementioned type of two stage transesterification polymerization technique for preparing linear aromatic polyesters is described by G. Bier, *Polymer* 15 527–535 (1974) and in K. Eise et al. German Preliminary Application No. 2,232,877, the subject matter of the latter article and application being incorporated herein by reference.

According to the improved transesterification or melt polymerization process of the invention, the phenyl benzoate is reacted into the polyester, i.e. reacted with the diaryl ester of the dicarboxylic acid concurrently with, or prior to, the transesterification polymerization reaction of the diaryl ester with the bisphenol.

In preparing the present polyester by the aforementioned concurrent mode of reaction of the phenyl benzoate, the phenyl benzoate is added to and allowed to react with the diaryl ester at the end, during, or desirably at the beginning of the transesterification polymerization of the diaryl ester and the bisphenol reactant. In other words, the phenyl benzoate reactant of the invention is reacted with the diaryl ester either simultaneously with, or subsequent to, mixing of the bisphenol and the diaryl ester to commence the polymerization.

The improved transesterification process of the invention is carried out employing the same conditions, catalysts and polyester product recovery techniques as catalyst are employed in the known procedures for preparation of a linear aromatic polyester of bisphenol and dicarboxylic acid residue via a transesterification polymerization reaction employing a final maximum polymerization reaction temperature of about 150° to about 350° C. or higher as described hereinabove.

Phenyl carboxylate ester-end capped polyesters containing a substantial proportion of the ester end cap group (e.g. at least 5 mole percent, based on the total end groups in the polyester, corresponding to at least about 0.25 weight percent of the end cap group based on the weight of the polyester) can be obtained in the present melt processes by employing a minor molar proportion (i.e. at least about 0.1 percent) of the phenyl benzoate reactant based on the dicarboxylic acid reactant.

Preferably, the present polyesters should contain a minor hydrolysis-stabilizing weight proportion (based on the weight of the polyester) of the benzoate end group. While this proportion will vary somewhat depending upon the particular bisphenol and dicarboxylic acid residues in the polyester, generally, however, satisfactory results are achieved according to the invention when the proportion of the present end group in the polyester is above about 0.5 to about 10 weight percent, preferably is about 1 to about 8 weight percent, preferably is about 2 to about 5 weight percent (based on the weight of polyester). Proportions of more than 10 weight percent, e.g. 20 weight percent or more, of the end groups are also useful but may be uneconomic because of the amounts of the phenyl benzoate required in their preparation.

Generally, to provide a polyester of enhanced hydrolytic stability the phenyl benzoate reactant is charged in the range of above about 2.5 to about 25 mole percent, preferably about 3.0 to about 10 mole percent and especially about 3.0 to about 8 mole percent based on the molar proportion of the dicarboxylic acid reactant.

In preparing the present polyesters, the proportions of dicarboxylic acid and bisphenol reactants used should be such as to provide for at least some carboxylate group termination in the polyester product (i.e. to provide a polyester in which the terminal residues of the polyester comprise a monomer residue of the dicarboxylic acid reactant). As is known, carboxylate group termination in linear aromatic polyesters comprising bisphenol and dicarboxylic monomer residues results from use of a molar proportion of the dicarboxylic acid reactant ranging from a stoichiometric excess of the dicarboxylic acid reactant (over the molar amount of bisphenol and any difunctional aliphatic modifier reactant employed) to a slight stoichiometric insufficiency of the dicarboxylic acid reactant corresponding to about a 5 mole percent stoichiometric excess of bisphenol and any difunctional aliphatic modifier reactant. Preferably, the polyesters of the invention are prepared employing a molar amount of dicarboxylic acid reactant which is about equivalent stoichiometrically to the molar amount of bisphenol and any difunctional aliphatic modifier reactant employed.

The phenyl benzoate reactant of the invention acts as a molecular weight control agent on the polyester product of the invention. Hence, as the molar proportion of the phenyl benzoate based on the moles of dicarboxylic acid reactant which are charged to the polyester preparation process is increased the molecular weight of the product polyester is generally lowered. Thus, with use of higher proportions of phenyl benzoate in preparing the present polyesters lower molecular weight polyesters are obtained.

The aforementioned higher molecular weight polyesters of the invention which are generally obtained with use of about 25 or less mole percent of phenyl benzoate (based on the moles of dicarboxylic acid reactant) are characterized by a degree of polymerization (d.p.) of above 8 (a d.p. of 8 corresponding to the presence in the polyester of seven bisphenol residues and eight dicarboxylic acid residues) for example, a degree of polymerization of up to 35 to 50 or higher. The aforementioned lower molecular weight polyesters which are generally obtained with use of more than 25 mole percent of phenyl benzoate (based on the moles of dicarboxylic acid reactant) are characterized by d.p. of 8 or less, e.g. a d.p. of 3.

The polyester products of the invention have enhanced hydrolytic stability and enhanced processing stability compared to corresponding polyesters having conventional ester end groups, e.g. para-t-butyl phenyl carboxylate ester end groups.

The polyesters of the invention generally possess an ease of processability comparable to conventional polyesters. In view of their excellent properties the improved polyesters of the invention are useful in preparation of molded polyester articles such as molded automotive and electrical equipment parts.

The polyesters of the invention may optionally, contain other additives such as organic or inorganic fillers, flame retardants, tensile strength stabilizers and the like.

The fillers which may be used in polyester compositions of the invention are preferably particulate fillers such as particulate glass (e.g. chopped glass fiber, glass rovings, glass microballoons or microspheres, and pulverulent glass) particulate clay, talc, mica, inorganic natural fibers, synthetic organic fibers, alumina, graphite, silica, calcium, carbonate, carbon black, magnesia and the like. Generally such fillers are added to reinforce the structural integrity of a polymer, e.g. to inhibit sagging and/or to improve the tensile strength and stiffness of the polymer composition and also to reduce shrinkage, minimize crazing, lower material costs, impart color or opacity, and improve the surface finish of the polymer composition. Generally the amount of particulate filler employed in the compositions of the invention is in the range of about 5 to about 70 weight percent, preferably about 5 to about 40 weight percent and especially about 8 to about 30 weight percent based on the combined weight of the polyester and the diester additive. The filler employed is preferably inorganic. Generally a particularly good result is obtained employing a particulate glass filler especially glass fiber.

While the polyesters of the invention are inherently of enhanced hydrolytic stability, the polyester of the invention may also contain in admixture a polymeric additive which further stabilizes the polyester against hydrolysis and/or oxidation.

Examples of suitable antioxidants are conventional phenolic antioxidants, phosphite-type antioxidants, amine-type antioxidants sulfur-containing compounds, organometallic compounds, and epoxy compounds. In addition, plasticizers, pigments and lubricants can also be incorporated in the aromatic polyester composition of this invention. Alternatively the aromatic polyester composition may be reinforced with glass fibers.

If desired, the aromatic polyester composition of this invention may contain at least one additional polymer such as polyalkylene terephthalates (e.g., polyethylene terephthalate or polybutylene terephthalate), poly-(ethylene oxybenzoate), polycarbonates, polyethylene, polypropylene, polyamides, polyurethanes, polystyrene, ABS resins, EVA copolymers, polyacrylates, polytetrafluoroethylene, polymethyl methacrylates, polyphenylene sulfide, and rubbers. In other words, a mixture of the aromatic polyester and another polymer exemplified above can be used.

Flame retardant additives which can also be employed as optional additives in the present polyester include the halogen-containing flame retardant agents.

The improved benzyl carboxylate ester group terminated polyesters of the invention are readily processed to films and molded articles employing equipment conventional in the processing of thermoplastics, e.g. injection and extrusion molding machines.

Typically the polyester (and if desired one or more of the aforementioned filler materials or additives in physical admixture with the polyester) is subjected to milling in molten condition and is then pressed as a film or molded (by an extrusion or preferably injection molding technique) employing the appropriate processing apparatus. If injection molding of the present compositions is desired, it may be desirable to substitute an extrusion molding step for processing of the molten composition in a mill prior to the final injection molding of the composition. Films, as well as various shaped molded articles such as rods, bars, ring, etc. can be prepared from the present thermoplastic polyesters.

The following examples further illustrate the various aspects of the invention but are not intended to limit it. Various modifications can be made in the invention without departing from the spirit and scope thereof.

EXAMPLE 1

The basic reactants in each case were Biphenol A, 22.83 gm (0.100 mole), Diphenyl isophthalate, 23.87 gm (0.075 moles), Diphenyl terephthalate 7.96 gm (0.025 mole) and potassium phenate (0.00005 mole) added as $K_2CO_3$ or a solution of $K_2CO_3$ in molten phenol (both are effective).

The reactants and catalyst were dried (vacuum oven, 75° C., overnight), weighed and charged to a tubeshaped glass reactor with a mechanical stirrer, gas inlet, receiver and oil-jacket with a heating tape wrapped on the outside of the jacket. The system was flushed with dry nitrogen. Vacuum was applied to the system (about 0.2 mm Hg) and the temperature of the oil in the jacket was raised to 100° C. for about 1.5 hours.

The vacuum was released with a flow of dry nitrogen and the temperature was raised to 210° C. When the system was molten and homogenous, and stirring, vacuum was applied gradually to remove the phenol. After 70 to 85 minutes, the temperature was 240° C. and vacuum about 0.1 mm and the reaction mixture was very viscous. The "prepolymer" was removed from the reactor (vacuum released with dry nitrogen first). An intrinsic viscosity measurement was run on this material. It was then ground to a powder in a micromill.

1.0 gm of the above ground prepolymer was charged to a 250 cc round bottom flask and distributed around the bottom half of the flask by rotating it slowly in a hot oil bath. Vacuum (about 0.1 mmHg) was applied to the flask. The flask was submerged (at least half way) in a thermostated oil bath set at 310° C. for 30 minutes. After 30 minutes the vacuum was released with dry nitrogen and the polymer scraped out of the flask. An intrinsic viscosity and thermogravimetric analysis (TGA) was run on the polymer.

An accurately weighed sample of 0.125 gm polymer was charged to a 25 cc volumetric flask and dissolved in 1,1,2,2 tetrachloroethane. Flow time was determined in a Cannon-Ubelharde viscometer at 30° C. and I.V. was calculated from the solution time, solvent time and k'=0.43 (determined in a separate experiment). Results are shown in Table 1.

TGA was run on a Mettler Thermoanalyzer Type TA2. The sample was dried (overnight, 100° C. under vacuum). It was weighed accurately (0.100 gm) and charged to a platinum cap which is then mounted on the apparatus. The system was kept under a flow of dry air. The temperature was raised at a rate of 25° C. per minute to 400° C. then held at 400° C. for 2 hours. Weight loss with time was recorded. Results are shown in Table 2.

TABLE 1

| Example No. | Phenyl Benzoate Added | Intrinsic Viscosity (dl/g) | |
|---|---|---|---|
| | | Prepolymer | Polymer |
| (1) | None | 0.30 | 0.73, 0.69 Av. 0.71 |
| (2) | 3 mole % (0.595 gm, 0.003 moles) | 0.27 | 0.64 |
| (3) | 6 mole % (1.19 gm, 0.006 moles) | 0.24 | 0.45 |

TABLE II

Thermogravimetric Analysis of Polymer

| Example No. | Weight loss at 400° C. (%) | | | |
|---|---|---|---|---|
| | 30 min. | 60 min. | 90 min. | 120 min. |
| 1 | 2.7 | 4.3 | 6.3 | 8.3 |
| | 3.5 | 5.4 | 7.7 | 9.6 |
| | 5.1 | 6.5 | 8.9 | 11.0 |
| | 6.2 | 10.0 | 14.1 | 17.4 |
| 2 | 2.0 | 3.3 | 4.5 | 5.9 |
| | 2.7 | 4.1 | 6.0 | 8.4 |
| 3 | 2.4 | 4.3 | 6.5 | 11.1 |
| Averages | | | | |
| 1 | 4.1 | 6.6 | 9.3 | 11.6 |
| 2 | 2.4 | 3.7 | 5.3 | 7.2 |
| 3 | 2.4 | 4.3 | 6.5 | 11.1 |

It can be seen from the data in Table I the presence of phenyl benzoate at the 3 mole % level has only a small effect on I.V. build-up in the polymerization. At the 6 mole % level there is a significant reduction in I.V. build-up. The effect of a particular level of phenyl benzoate will vary with the type of catalyst used and also the particular equipment and scale used to prepare the polymer.

There is some variability in the TGA data (Table II). However, there is a definite indication of improved stability in the polymers in which phenyl benzoate was included in the formulation.

Based on I.V. build-up and thermal stability, the formulation with 3-mole % phenyl benzoate is preferred.

Therefore, with proper choice of phenyl benzoate level, improved thermal stability can be achieved with adequate I.V. build-up.

What is claimed:

1. A process for end-capping a melt prepared aromatic polyester comprising melting a mixture of a dicarboxylic acid or diester thereof, a bisphenol and phenyl benzoate and reacting said mixture at elevated temperatures to produce a linear aromatic polyester which contains terminal groups of said dicarboxylic acid or ester thereof, wherein said terminal groups comprise benzoate groups.

2. The process of claim 1 wherein said aromatic dicarboxylic acid is selected from the group consisting of terephthalic acid, isophthalic acid, and mixtures thereof.

3. The process of claim 1 wherein said bisphenol has the formula:

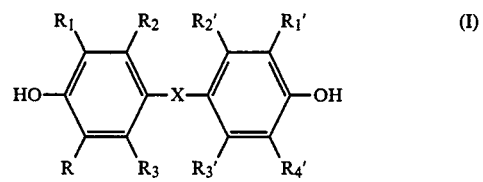

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and $R_1$, $R_2$, $R_3$, $R_4$, $R_1'$, $R_2'$, $R_3'$, and $R_4'$, which are the same or different, each represents a member selected from the group consisting of a hydrogen atom, a chlorine atom, a bromine atom and an alkyl group containing 1 to 4 carbon atoms, or functional derivatives thereof.

4. The process of claim 3 wherein said bisphenol is bisphenol A.

5. The process of claim 2 wherein said aromatic dicarboxylic acid diesters comprise diaryl esters of said terephthalic acid and said isophthalic acid.

6. The process of claim 5 wherein said diaryl esters are the diphenyl esters.

7. The process of claim 1 wherein said polymerization is carried out in the presence of a basic catalyst for said polymerization, said catalyst being introduced in liquid form to the polymerization zone.

8. The process of claim 1 wherein said polymerization is conducted in a first stage to prepare a polyester oligomer and the reaction is continued in a second stage to produce the polyester product, said polymerization being carried out batchwise or substantially continuously in said second stage.

9. The process of claim 8 wherein the polymerization in the first stage is carried out batchwise.

10. The process of claim 8 wherein the polymerization in said first stage is substantially continuous.

11. The process of claim 1 wherein about 2.5 to 25 mole percent phenyl benzoate relative to said dicarboxylic acid or diester thereof is added to said mixture to provide said terminal benzoate groups.

12. The process of claim 11 wherein 3 mole percent phenyl benzoate relative to said dicarboxylic acid or diester thereof is added to said mixture to provide said terminal benzoate groups.

* * * * *